United States Patent
Vernia et al.

(10) Patent No.: US 9,772,885 B2
(45) Date of Patent: Sep. 26, 2017

(54) VIRTUAL MACHINE NETWORK ASSIGNMENT

(71) Applicant: Red Hat Israel, Ltd., Raanana (IL)

(72) Inventors: Lior Vernia, Tel-Aviv (IL); Dan Kenigsberg, Dublin (IE)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/626,377

(22) Filed: Feb. 19, 2015

(65) Prior Publication Data
US 2016/0246624 A1    Aug. 25, 2016

(51) Int. Cl.
*G06F 9/455* (2006.01)
*G06F 9/50* (2006.01)

(52) U.S. Cl.
CPC ........ *G06F 9/5077* (2013.01); *G06F 9/45558* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,175,103 B2 | 5/2012 | Germain et al. | |
| 8,639,783 B1 | 1/2014 | Bakke et al. | |
| 8,665,747 B2* | 3/2014 | Elsen | H04L 12/462 370/254 |
| 9,491,678 B2* | 11/2016 | Cui | H04W 36/22 |
| 2011/0022694 A1* | 1/2011 | Dalal | H04L 41/0843 709/222 |
| 2011/0035494 A1 | 2/2011 | Pandey et al. | |
| 2011/0075608 A1* | 3/2011 | Chai | H04W 48/18 370/328 |
| 2012/0309447 A1* | 12/2012 | Mustajarvi | H04W 48/18 455/524 |
| 2013/0061293 A1* | 3/2013 | Mao | G06F 21/53 726/4 |
| 2013/0152075 A1 | 6/2013 | Cardona et al. | |
| 2014/0094159 A1* | 4/2014 | Raleigh | H04W 24/02 455/418 |
| 2014/0201733 A1 | 7/2014 | Benny et al. | |
| 2014/0282532 A1 | 9/2014 | Abidi et al. | |
| 2014/0337832 A1* | 11/2014 | Adogla | G06F 9/45558 718/1 |

OTHER PUBLICATIONS

Davy, Steven, et al. ,"Policy-Assisted Planning and Deployment of Virtual Networks", NMG, Universitat Politenica de Catalunya, Barcelona, Spain; TSSG, Waterford Institute of Technology, Waterford, Ireland; CINVESTAV Tamaulipas, Mexico, 2011, 8 pages http://www.simpleweb.org/ifip/Conferences/CNSM/2011/papers/85726_1.pdf.

(Continued)

*Primary Examiner* — Gregory A Kessler
(74) *Attorney, Agent, or Firm* — Lowenstein Sandler LLP (57) ABSTRACT

A processing device of a data center may receive a request to run a virtual machine. Responsive to determining that the virtual machine comprises a virtual network interface card (VNIC) associated with a VNIC profile that comprises a pre-defined custom property, the processing device may identify a network to be associated with the VNIC. The processing device may then associate the VNIC with the identified network.

17 Claims, 5 Drawing Sheets

(56) References Cited

OTHER PUBLICATIONS

Luo, Yan, et al., "Accerlerated Virtual Switching with Prgrammable NICs for Scalable Date Center Networking", Dept. of Electrical and computer Engineering, University of Massachusetts Lowell, Lowell, MA, Sep. 3, 2010, pp. 65-72 http://conferences.sigcomm.org/sigcomm/2010/papers/visa/p65.pdf.
Lowe, Scott, "Understanding NIC Utilization in VMware EXX", scottlowe.org, Jul. 16, 2008, 12 pages http://blog.scottlowe.org/2008/07/16/understanding-nic-utilization-in-vmware-esx/.
Nurmi, Daniel, et al., "The Eucalyptus Open-source Cloud-computing System", Computer Science Department, University of California, Santa Barbara, Santa Barbara, CA, May 18, 2009, pp. 1-8 http://ieeexplore.ieee.org/xpl/login.jsp?tp=&arnumber=5071863&url=http%3A%2F%2Fieeexplore.ieee.org%2Fxpls%2Fabs_all.jsp%3Farnumber%3D5071863.

* cited by examiner

FIG. 4

VIRTUAL MACHINE NETWORK ASSIGNMENT

TECHNICAL FIELD

The present disclosure is generally related to virtualized computer systems, and is more specifically related to assigning a network to a virtual machine.

BACKGROUND

Virtualization in information processing systems allows for multiple instances of one or more operating systems to run on resources (or components) of one or more hosting computing devices ("host"). Virtualization is typically implemented by using software (e.g., a virtual machine monitor, or a "VMM") to present to each OS a "virtual machine" ("VM") having virtualized hardware resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while "host software" is software, such as a VMM, that runs outside of, and may or may not be aware of, the virtualization environment.

VM(s) may run on one or more hosts. Further, each of the VM(s) may run under the control of a respective OS which may or may not be different from the OS of another VM. Hardware resources of the one or more hosts may also be virtualized. Thus, instead of directly interacting with physical hardware devices (such as processing units, hard drives, network interfaces (NICs) etc.), the operating systems of VM(s) may control virtualized hardware components (such as virtual processing units, virtual disks, and virtual network interface cards etc.). The virtualization of hardware devices may hide the physical characteristics of the one or more hosts from users.

BRIEF DESCRIPTION OF THE DRAWINGS

The present disclosure is illustrated by way of examples, and not by way of limitation, and may be more fully understood with references to the following detailed description when considered in connection with the figures.

DETAILED DESCRIPTION

A client may submit a request to a data center to create and run a large number of virtual machines, perhaps hundreds or thousands. For scalability reasons, the client may desire that the networking load from the large number of virtual machines be spread out over two or more networks. In common implementations, the client may use multiple virtual machine templates, each template specifying a different network, and may request that a certain number of virtual machines be generated from each of the multiple virtual machine templates. The present disclosure provides an alternative method of virtual machine network assignment, according to which multiple virtual machines may be created using a single template. Later, when a virtual machine is started or when a new network interface is plugged into the virtual machine, the hypervisor may select, from a certain pool of networks, a network to be associated with the virtual machine.

In certain implementations, a pool of networks may be defined and configured on a plurality of host computer systems. Virtual network interface card (VNIC) profile associated with VNIC cards of one or more virtual machines may be modified to include a custom property (e.g., identified by a certain name) that specifies the pool of networks. Responsive to receiving a request to run a virtual machine, the hypervisor may determine that a VNIC of the virtual machine is associated with a VNIC profile that comprises the pre-defined custom property. The hypervisor may then select, from the pool of networks, a network to be associated with the VNIC, as described in more details herein below.

The network selection may be governed by a certain policy. In an illustrative example, the network selection policy may be a load-balancing policy, designed to uniformly distribute traffic across the networks. Alternatively, the network selection policy may require allocating virtual machines to a network until a threshold number of virtual machines are allocated to the network, and then allocating other virtual machines to a next network in a pre-defined ordered list of networks. Alternatively, the network selection policy may require allocating virtual machines to networks according to the weights assigned to those networks. The network selection policies described herein are illustrative examples only, and do not in any way limit the scope of the present disclosure.

Figure 1:
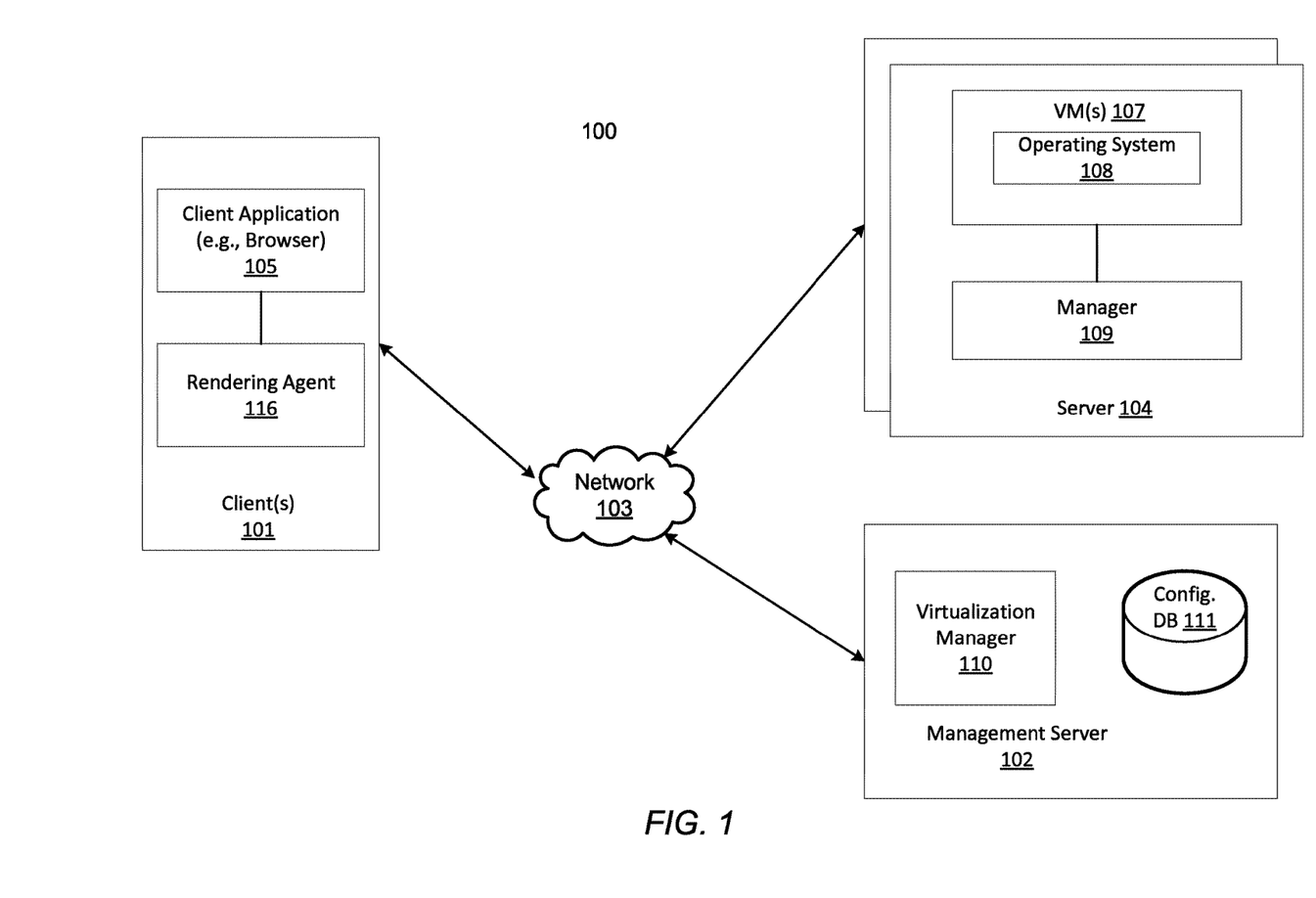
FIG. 1 is a block diagram illustrating a virtualization computing system according to an implementation of the disclosure.

FIG. 1 is a block diagram illustrating a virtualization computing system 100 according to an implementation of the disclosure. Referring to FIG. 1, the system 100 may include, but not be limited to, one or more clients 101 communicatively coupled to a remote server or a cluster of hosts 104 over a network 103. Server 104 may represent an independent machine. Network 103 may be a local area network (LAN) or a wide area network (WAN) and may be a combination of one or more networks. Client 101 can be any computer system in communication with server 104 for remote execution of applications.

Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., desktop application 108) can generate output display commands (e.g., graphics commands, simply referred to herein as graphics data), which may include one or more paint and/or draw operations, for example, in the form of executable instructions. The output display commands can then be transmitted (e.g., as graphics update commands) with an optional compression back to the remote client and a remote display driver (e.g., a rendering agent 116) of the remote client can collect the graphics commands and generate corresponding drawing commands for rendering at a display device of the client. Note that a desktop application is utilized herein as an example; however, any other application may also be applied.

In one implementation, server 104 is to host one or more virtual machines 107, each having one or more desktop applications 108 (e.g., desktop operating system). Operating system 108 may be executed and hosted within virtual machine 107. Such an operating system in virtual machine 107 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows™ operating system from Microsoft and a host OS may be a Linux operating system available from Red Hat.

System 100 may be implemented as part of a server or a cluster of servers within a data center of an enterprise entity. Server 104 may be managed by a management server 102, which may be a separate machine or part of the machine hosting server (e.g., virtual desktop server or VDS). For example, host server 104 may be implemented as a VDS server while management server 102 may be implemented as a VDC (virtual desktop control) server.

In one implementation, server 104 may be a member of a cluster of servers, where each of the member servers of the same cluster is coupled to the same network or the same segment of a network, also referred to as a logical network. In one implementation, server 104 may include multiple network interfaces (not shown), which may be coupled to the same or different logical network. Each network interface of server 104 may be configured via management server 102. Server (hosts) 104 may be configured to be coupled to multiple networks (physical or logical network), such as, a storage network, a virtual local area network (VLAN) for the guests, a management network, and/or a remote display network for remote accesses, etc.

Figure 2A:
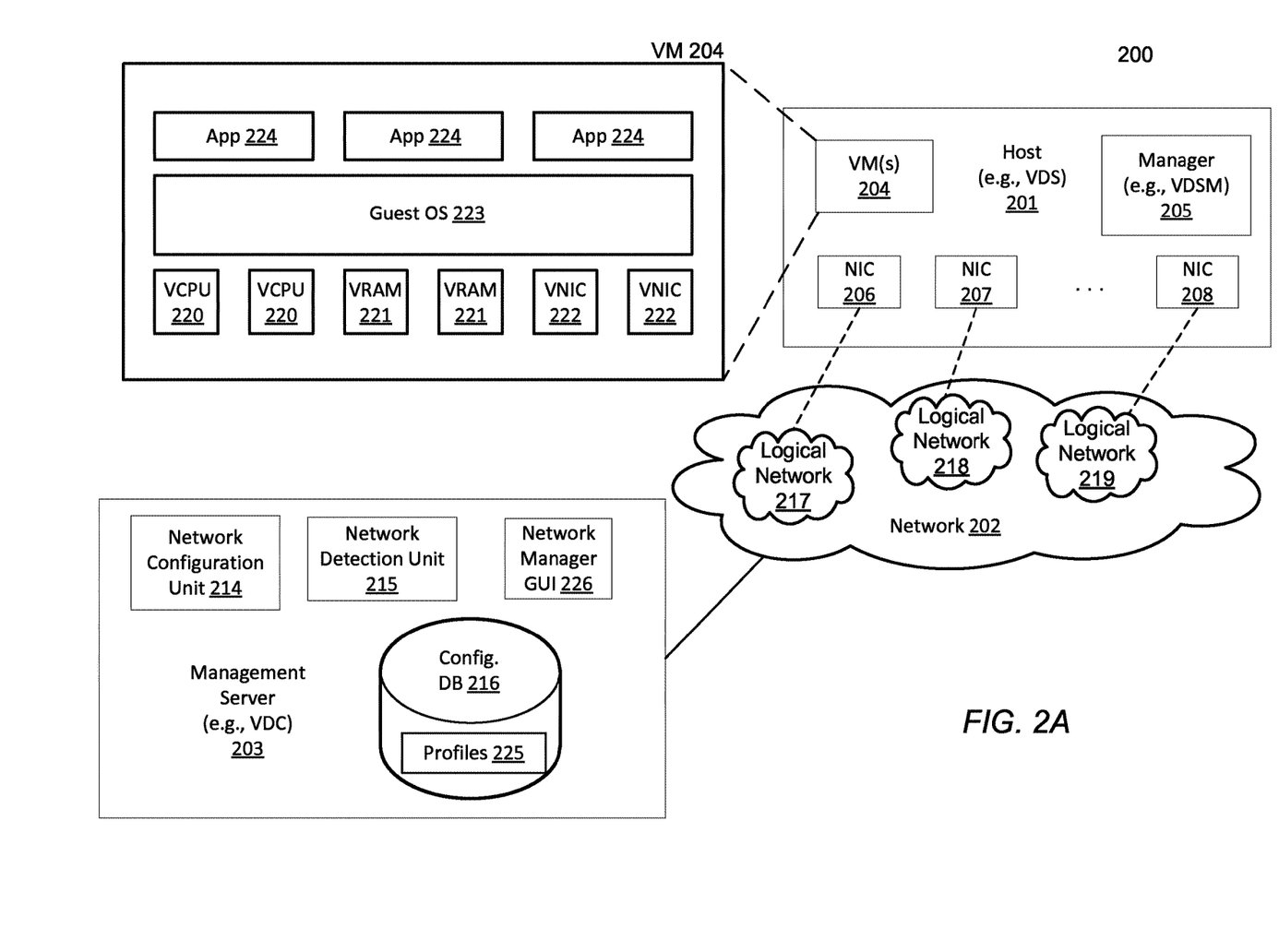
FIG. 2A is a block diagram illustrating a data center according to an implementation of the disclosure.

FIG. 2A is a block diagram illustrating a data center 200 according to an implementation of the disclosure. The data center 200 may include host(s) 201, management server 203, and a network 202. In one implementation, host(s) 201 may be implemented as part of a cluster associated with server 104 (e.g., VDS) and management server 203 may be implemented as part of server 102 (e.g., VDC) of FIG. 1. Referring to FIG. 2A, host(s) 201 and management server 203 are communicatively coupled to each other over network 202. Each of the host(s) 201 may include one or more network interfaces (also referred to as network interface cards or NICs) and host one or more VMs. In this example, host(s) 201 includes NICs 206-208 and hosts one or more VMs 204. Each NIC may be associated with one or more VM hosted by host 201.

In this example, NIC 206 is coupled to network 217; NIC 207 is coupled to network 218; and NIC 208 is coupled to network 219. In various illustrative examples, each of networks 217, 218, and 219 may be provided by a physical or a logical network. Each of networks 217-219 is associated with a network identifier (e.g., network label). Note that multiple NICs may be coupled to the same or different networks dependent upon a specific network configuration. Similarly, a single NIC may be coupled to multiple logical networks. According to one implementation, after a first host in a network has been detected and configured by an administrator via management server 203, a subsequent host entering the same network can be at least partially automatically configured by server 203 using the network configuration information obtained from an existing host, which may be stored in configuration database 216.

In one implementation, VM(s) 204 may also include a guest operating system 223 that controls the operations of virtual components including virtual central processing units (VCPUs) 220, virtual random access memories (VRAM) 221, and virtual network interface cards (VNICs) 222. VCPUs 220 may be mapped to one or more processing devices in host(s) 201, VRAMs 221 may be mapped to one or more memory devices in host(s) 201, and VNICs 222 may be mapped to one or more NICs 206-208 all by VMM. In one implementation, a VNIC may include a set of configurable attributes, such as QoS. These attributes may be configured with values so that the VNIC may communicate with a logical network as specified by these values. Applications 224 may be executed by VCPUs 220 utilizing virtual resources such as VRAMs 221 and VNICs 222.

Figure 2B:
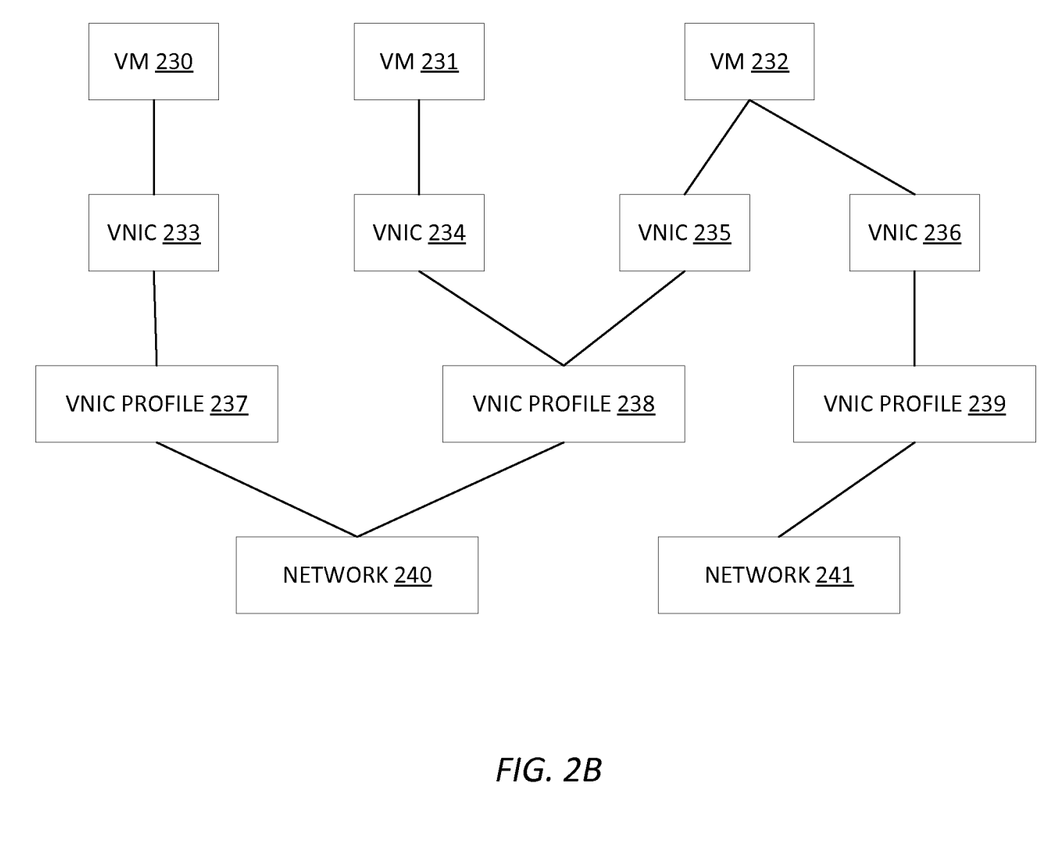
FIG. 2B illustrates an example virtual machine network configurations using profiles according to an implementation of the disclosure.

FIG. 2B illustrates an example virtual machine network configurations using VNIC profiles according to an implementation of the disclosure. Referring to FIG. 2B, each of VMs 230-232 may include one or more network interfaces represented by VNICs 233-236. For example, VMs 230, 231 may be associated with VNIC 233, 234, respectively, and VM 232 may be associated with VNICs 235, 236. VNIC profiles may be used to specify the associations of each VNIC 233-236 to logical networks 240-241. A VNIC profile may include a list of network configuration attributes ("attributes") and their corresponding values ("values"). In one implementation, the attributes may include, but not limited to, identifier of a network (e.g., a network label) to which the VNIC associated with the profile should be connected, the quality of service (QoS), port mirroring, and/or custom network properties. Values in each profile may be used to specify the attributes of one or more VNICs associated with the VNIC profile. For example, profiles 237, 239 may specify the attributes of VNICs 233, 236, respectively, and profile 238 may specify the network configuration attributes of VNICs 234, 235. The profiles may be saved on the management server so that multiple VNICs may share a same profile. Therefore, instead of configuring each attribute of each VNIC, multiple VNICs may be configured using one profile. In this way, the process to configure VNICs may be simplified by using profiles.

Referring to FIG. 2A, in one implementation, one or more profiles 225 may be specified using a network manager graphic user interface (GUI) 226. Once specified, the profiles 225 may be stored as files in configuration database 216 of management server 203. A profile may be used to configure one or more VNICs 222 of VM(s) 204 running on host(s) 201. For example, a profile 225 may be transmitted by network configuration unit 214 of management server 214 to manager 205 (such as VDSM manager) of host(s) 201. In one implementation, profiles 225 may be specified according an application programming interface (API) such as the VDSM API. The VDSM manager of host 201 may parse the profile 225 and apply the attributes specified in the profile 225 to one or more VNICs. In this way, VNICs may be efficiently configured using one or more profiles 225.

In another implementation, privileges to access some of the one or more profiles 225 may be granted (e.g., at the direction of a network administrator) to a user of the VMs so that the user may select a profile to apply to VNICs. In this way, part of the task to configure VNICs 222 of VMs may be delegated to users, thus further reducing the burden on the network administrator to configure VNICs 222.

In one implementation, one or more profiles 225 may also be stored locally on host(s) 201 so that manager 205 may retrieve a profile more conveniently. For example, manager 205 may store a local copy of each profile that has been used to configure at least one VNIC on host(s) 201. Thus, instead of retrieving these profiles from configuration database 216 via network 220, subsequent configurations of VNICs 222 may be achieved by retrieving the local copies of the profiles.

In accordance with one or more aspects of the present disclosure, a pool of networks may be defined and configured on a plurality of host computer systems. Virtual network interface card (VNIC) profile associated with VNIC cards of one or more virtual machines may be modified to include a custom property (e.g., identified by a certain name) that specifies the pool of networks. Responsive to receiving a request to run a virtual machine, the hypervisor may determine that a VNIC of the virtual machine is associated with a VNIC profile that comprises the pre-defined custom property. The hypervisor may then select, from the pool of networks, a network to be associated with the VNIC, as described in more details herein below.

Figure 3:
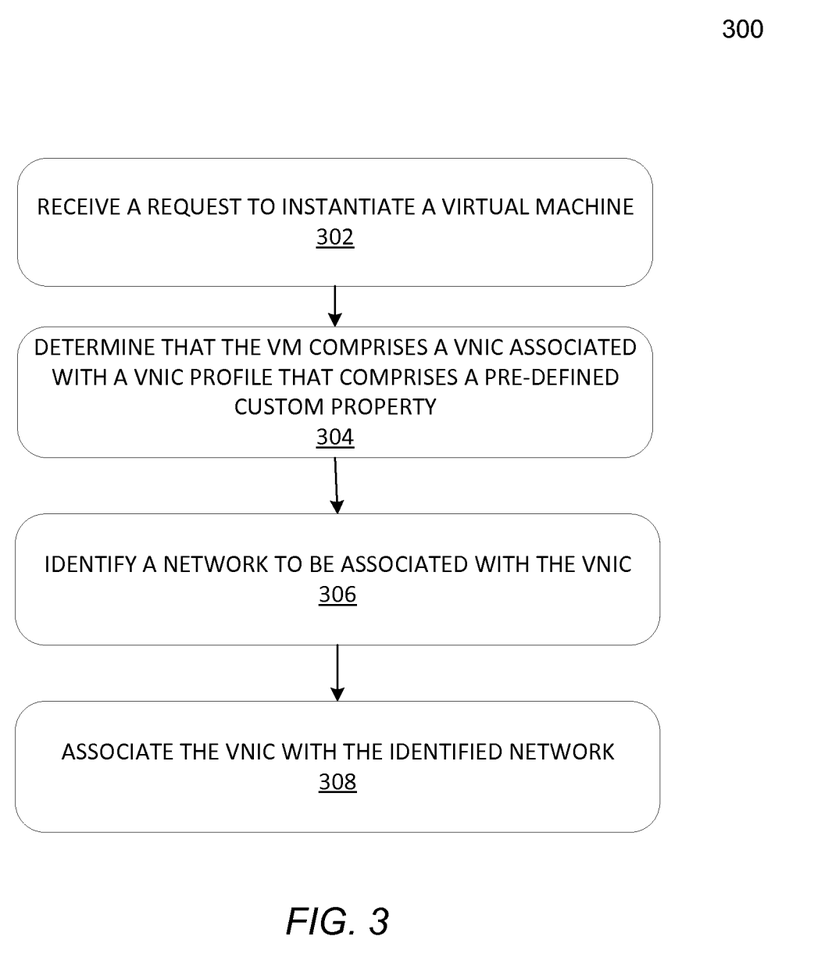
FIG. 3 shows a flow diagram illustrating an example of a method of assigning a network to a virtual machine.

FIG. 3 shows a flow diagram illustrating an example of a method 300 of assigning a network to a virtual machine. Method 300 may be performed by a processing logic that may include hardware (e.g., circuitry, dedicated logic, programmable logic, microcode, etc.), software (e.g., instructions run on a processing device to perform hardware simulation), or a combination thereof. In one example, method 300 may be performed by management server 203 or host 201 as shown in FIG. 2A.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 3, at 302, the processing device of a hypervisor implementing the method receives a request to run a virtual machine. The virtual machine may comprise a VNIC associated with a VNIC profile.

Responsive to determining, at 304, that the VNIC profile comprises a custom property (e.g., identified by a certain name), the processing device may, at 306, identify a network to be associated with the VNIC of the virtual machine.

In certain implementations, the custom property may specify a pool of networks among which to select a network for associating with the VNIC of the virtual machine. In an illustrative example, the custom property value may comprise a comma-separated list of network identifiers. In another illustrative example, the custom property value may specify a common prefix shared by identifiers of the networks comprised by the pool. In yet another illustrative example, the custom property value may specify a NIC or bond shared by the networks comprised by the pool.

The processing device may employ a certain network selection policy for selecting a network of the pool of networks. In certain implementations, the network selection policy may be a random selection policy indicating the network is to be selected randomly. In an illustrative example, the network selection policy may be a uniformly random selection policy such that each of the specified networks has an approximately equal chance of being selected. In another illustrative example, the network selection policy may be a weighted random selection policy such that each of the specified networks is associated with a probability of being selected wherein at least two of the probabilities for two of the networks are different.

In certain implementations, the network selection policy may be a load-balancing policy indicating that the network is to be selected to uniformly distribute traffic among the plurality of networks. The load-balancing policy may receive information about the traffic among the plurality of networks and use the information in determining which network to select. For example, the load-balancing policy may receive information about IP availability throughout the networks.

In certain implementations, the network selection policy may be an exhaustive selection policy indicating that the network is to be selected to exhaust a first logical network before selecting a second network. For example, the exhaustive selection policy may indicate that when (and only when) 100 VMs have been assigned to network "Red001," all other VMs should be assigned to network "Blue001."

The network selection policy may include combinations of the above policies or other types of network selection policies. The network selection policy may be user-defined and received from a client. The network selection policy may be received and stored as executable code for effectuating the network selection policy that takes as an input at least information regarding a plurality of logical networks and returns as an output a selection of one of the plurality of networks.

At block 308, the processing device associates a VNIC of the virtual machine with the selected one of the plurality of logical networks. The processing device may then run the virtual machine.

Figure 4:
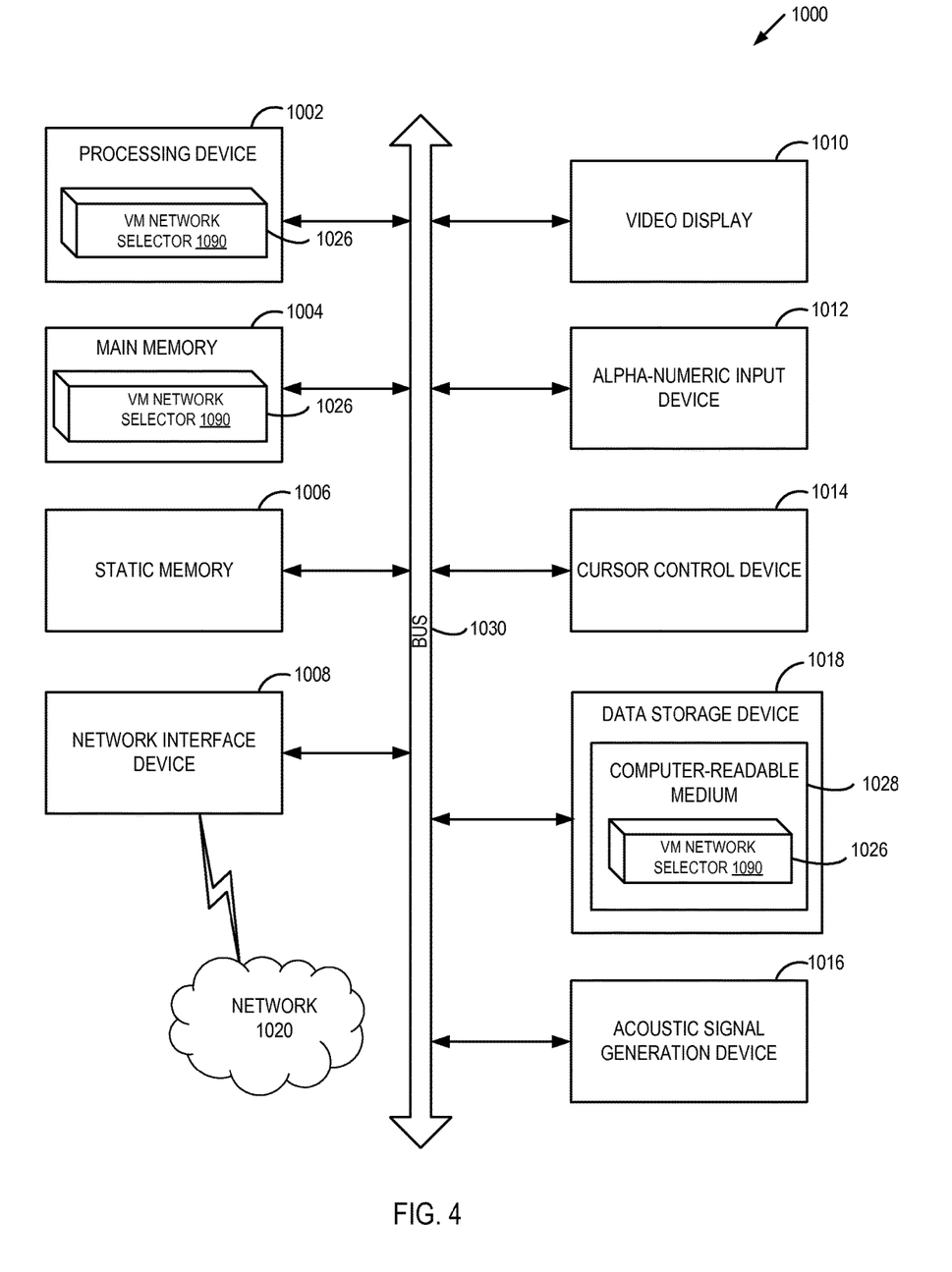
FIG. 4 schematically illustrates a component diagram of an example computer system which can perform any one or more of the methods described herein.

FIG. 4 schematically illustrates a component diagram of an example computer system 1000 which can perform any one or more of the methods described herein. In various illustrative examples, computer system 1000 may represent server 104 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute virtual machine network selector module 1090 implementing method 300 for assigning logical networks to virtual machines.

Example computer system 1000 may further comprise a network interface device 1008, which may communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of resource allocation component, including method 300 for selecting a network for a virtual machine.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:
1. A method comprising:
receiving, by a processing device, a request to run a virtual machine, the request comprising a network selection policy;

identifying a virtual network interface card (VNIC) associated with the virtual machine;

selecting, by the processing device, in view of the network selection policy, a network from a pool of networks identified by a property specified by a VNIC profile associated with the VNIC, wherein the property defines a prefix shared by identifiers of networks comprised by the pool of networks and wherein the network selection policy defines a first probability of selecting a first network and a second probability of selecting a second network; and associating the VNIC with the network.

2. The method of claim 1, further comprising running the virtual machine.

3. The method of claim 1, wherein the property references a list of network identifiers.

4. The method of claim 1, wherein the property specifies a parameter shared by networks comprised by the pool.

5. The method of claim 1, wherein the network selection policy further defines a uniform distribution of traffic among the plurality of logical networks.

6. The method of claim 1, wherein the network selection policy further defines an order of networks.

7. The method of claim 1, wherein the first probability is different from the second probability.

8. A system comprising:
a memory; and
a processing device operatively coupled to the memory, the processing device to:
   receive a request to run a virtual machine, the request comprising a network selection policy;
   identify a virtual network interface card (VNIC) associated with the virtual machine;
   select, by the processing device, in view of the network selection policy, a network from the pool of networks identified by a property specified by a VNIC profile associated with the VNIC, wherein the property defines a prefix shared by identifiers of networks comprised by the pool of networks and wherein the network selection policy defines a first probability of selecting a first network and a second probability of selecting a second network; and
   associate the VNIC with the network.

9. The system of claim 8, wherein the property references a list of network identifiers.

10. The system of claim 8, wherein the property specifies a parameter shared by networks comprised by the pool.

11. The system of claim 8, wherein the network selection policy further defines a uniform distribution of traffic among the plurality of logical networks.

12. The system of claim 8, wherein the network selection policy further defines an order of networks.

13. The system of claim 8, wherein the first probability is different from the second probability.

14. A non-transitory computer-readable medium having instructions encoded thereon which, when executed by a processing device, causes the processing device to:
   receive, by the processing device, a request to run a virtual machine, the request comprising a network selection policy;
   identify a virtual network interface card (VNIC) associated with the virtual machine;
   select, by the processing device, in view of the network selection policy, a network from the pool of networks identified by a property specified by a VNIC profile associated with the VNIC, wherein the property defines a prefix shared by identifiers of networks comprised by the pool of networks and wherein the network selection policy defines a first probability of selecting a first network and a second probability of selecting a second network; and
   associate the VNIC with the network.

15. The non-transitory computer-readable medium of claim 14, wherein the property specifies a parameter shared by networks comprised by the pool.

16. The non-transitory computer-readable medium of claim 14, wherein the property references a list of network identifiers.

17. The non-transitory computer-readable medium of claim 14, wherein the first probability is different from the second probability.

* * * * *